April 25, 1933.  J. F. SINK  1,905,402

TELEPHONE INSTALLATION APPARATUS

Filed July 2, 1932

James Frank Sink
INVENTOR.

BY Paul S Eaton
ATTORNEY.

Patented Apr. 25, 1933

1,905,402

UNITED STATES PATENT OFFICE

JAMES FRANK SINK, OF WINSTON-SALEM, NORTH CAROLINA

TELEPHONE INSTALLATION APPARATUS

Application filed July 2, 1932. Serial No. 620,589.

This invention relates to an article of furniture having means attached thereto or built thereinto for receiving the necessary equipment for telephones without the necessity of marring the desk by a plurality of installations. Heretofore, it has been the custom in installing telephones on desks and the like, to secure the bell box or ringing box on the side of the desk by screws and the like, and due to many changes of offices and a plurality of installations of telephones the desk becomes scarred and damaged.

It is an object of this invention to provide means adapted to be built into new desks or installed on used desks whereby installation of telephones can be made without in any way scarring or damaging the desk and the like.

The invention broadly comprises the installation of supporting means on the lower portion of the desk and the like and providing a conduit leading from the supporting means to the exterior side portion of the desk whereby the bell box may be supported beneath the desk and the like and the cord leading to the telephone proper can be led thru a conduit to the exterior of the desk and the like from which the cord is led to the telephone set located on top of the desk or in some instances attached to the side of the desk. In this way installation of telephones can be made without damage to the most expensive desks and other articles of furniture. Some of the objects of the invention having been stated, the invention will more fully hereinafter appear when taken in connection with the accompanying drawing, in which Figure 1 is a front elevation of a portion of a desk showing my invention as applied hereto;

Figure 3:
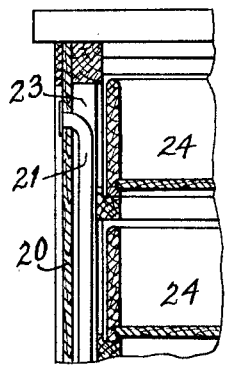
Figure 3 is a vertical sectional view taken along the line 3—3 in Figure 2.
Figure 4:
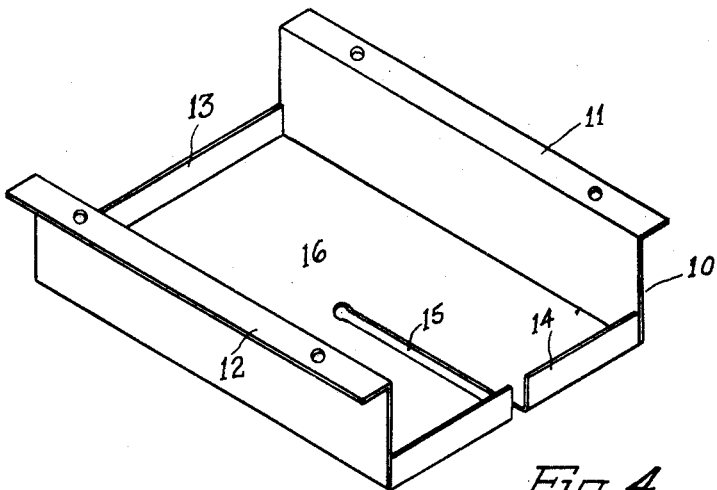
Figure 4 is an isometric view of the box holding bracket.
Figure 1:
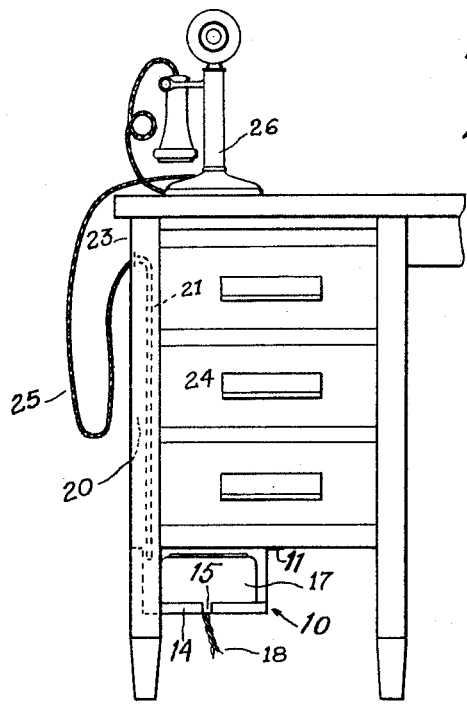
Figure 5:
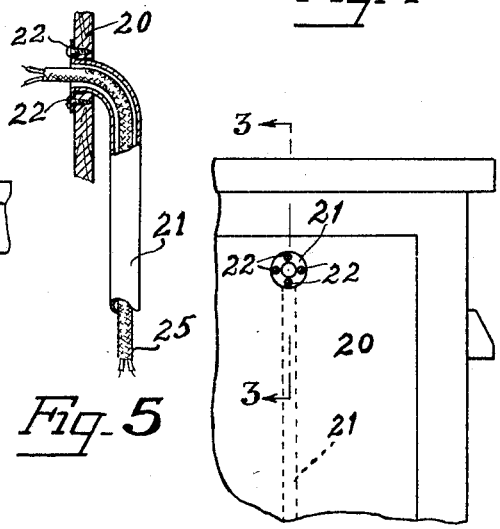
Figure 5 is an enlarged detail, partly in section, showing a portion of the cord carrying tube.
Figure 2:
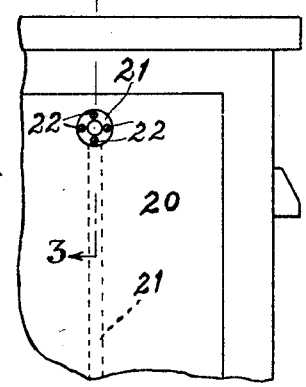
Figure 2 is a side elevation, looking from the left hand side of Figure 1.

Referring more specifically to the drawing, 10 indicates a U-shaped bracket having flanges 11 and 12 which are adapted to be secured to the bottom of the desk and the like. Bracket 10 has a projection 13 at one end thereof and a projection 14 at the other end thereof, a slot 15 being provided so that when bracket 14 is bent to occupy a position parallel with bottom 16 of the bracket that a bell box 17 can be inserted in position and the incoming wires 18 will pass thru slot 15. Penetrating the side panel 20 of the desk is a tube 21 which is secured to the panel 20 by any suitable means such as screws 22. This tube 21 projects downwardly in the space 23 occurring between panel 20 and the drawers 24 of the desk and the lower end of tube 21 projects in close proximity to one side wall of bracket 10 and cord 25 leading from bell box 17 to telephone set 26 is passed thru tube 21.

It is thus seen that mechanism is provided in association with a desk or other article of furniture whereby installation and removal of telephone equipment is made easy and also can be made without defacing the article of furniture in any manner whatsoever.

In the drawing and specification there has been set forth a preferred embodiment of the invention and although specific terms are employed, they are used in a generic and descriptive sense only and not for purposes of limitation the scope of the invention being set forth in the appended claims.

I claim:

1. In a desk and the like, a support for a telephone bell box secured to the lower portion of the desk, said support comprising an open ended U-shaped bracket enclosing at least three sides of the box, a conduit for a telephone cord leading from the support to the exterior of the side portion of the desk, said support having a slot therein thru which the incoming wires to the bell box may be inserted as the bell box is inserted into the support.

2. In a desk and the like having superimposed drawers, a U-shaped bracket secured to the lower side of the desk below said drawers, vertically disposed conduit leading from the bracket between the side panel of the desk and the drawers and communicating with the outside of said panel and thru which conduit a telephone cord is adapted to be passed, said bracket having a slot therein thru which the incoming wire to a telephone bell box may pass as the said box is inserted into said bracket.

3. A desk having a U-shaped bracket and means for securing the same to the lower side of the desk for supporting a telephone ringing box below a desk and enclosing at least three sides of the box, tubing concealed in the desk and having one end projecting thru one side of the desk and thru which the cord from the telephone ringing box to the telephone is inserted, the other end of the tubing being disposed in close proximity to the said bracket, said bracket having an open ended slot therein through which the incoming wires to the bell box may be inserted as the bell box is inserted into the U-shaped bracket.

4. A desk having installation apparatus for telephones comprising a U-shaped bracket secured to the lower side of the desk for supporting the ringing box and enclosing at least three sides of the box, a concealed tube leading from said bracket upwardly thru the desk and to the exterior of the side of the desk thru which tube the cord to the telephone set is adapted to pass, said bracket having an open ended slot therein through which the incoming wires to the bell box may be inserted as the bell box is inserted into the U-shaped bracket.

In testimony whereof I affix my signature.

JAMES FRANK SINK.